United States Patent [19]
Phillips et al.

[11] Patent Number: 5,988,577
[45] Date of Patent: Nov. 23, 1999

[54] ADJUSTABLE CARRIER ASSEMBLY FOR A WIRELESS COMMUNICATION DEVICE

[75] Inventors: William Charles Phillips, Evanston; David William Trahan, Grayslake, both of Ill.

[73] Assignee: Motorola, Inc., Schaumburg, Ill.

[21] Appl. No.: 09/001,296

[22] Filed: Dec. 31, 1997

[51] Int. Cl.⁶ .................................................. A47B 96/06
[52] U.S. Cl. .............................. 248/231.81; 248/316.1; 248/292.13; 24/505; 224/197; 224/930; 379/446; 379/455
[58] Field of Search .............................. 248/316.1, 316.7, 248/682, 689, 229.16, 229.26, 228.7, 231.81, 289.11, 291.1, 292.12, 292.14, 299.1, 292.13; 24/505, 457, 489, 516; 224/197, 269, 666, 930; 379/446, 455, 454

[56] References Cited

U.S. PATENT DOCUMENTS

| | | | |
|---|---|---|---|
| 397,748 | 2/1889 | Palmenberg | 248/291.1 |
| 2,051,406 | 8/1936 | Green | 248/229.16 |
| 3,915,361 | 10/1975 | Perkins | 224/2 B |
| 3,956,701 | 5/1976 | James, Jr. et al. | 325/352 |
| 4,040,547 | 8/1977 | Dickey | 224/5 H |
| 4,100,653 | 7/1978 | Sensabaugh | 24/3 |
| 4,504,001 | 3/1985 | Nichols | 224/198 |
| 4,782,435 | 11/1988 | Manzoi | 248/291.1 X |
| 4,883,290 | 11/1989 | Landa | 280/814 |
| 5,261,583 | 11/1993 | Long et al. | 224/245 |
| 5,472,317 | 12/1995 | Field et al. | 417/234 |
| 5,551,611 | 9/1996 | Gilmore | 224/198 |
| 5,833,100 | 11/1998 | Kim | 224/197 |

FOREIGN PATENT DOCUMENTS 561390  10/1923  France ........................ 248/229.16

*Primary Examiner*—Derek J. Berger
*Assistant Examiner*—Gwendolyn Baxter
*Attorney, Agent, or Firm*—Lalita P. Williams

[57] ABSTRACT

An adjustable carrying assembly for a wireless communication device, such as a radiotelephone. The carrying assembly is comprised of a device support member having a first spring coupled thereto for receiving the communication device and a clip mechanism coupled thereto for mounting the carrier assembly on a user's belt or other article of clothing. The clip mechanism comprises a clip support member, a pin, a clip, a second spring and a cap. One end of clip support member includes an opening with a plurality of grooves arranged in a circular array. The device support member is rotatably attached to the clip support member of the clip mechanism such that when the user rotates the device support member with respect to the clip mechanism, first spring moves from one of the plurality of grooves to another of the plurality of grooves and locks into position.

3 Claims, 4 Drawing Sheets

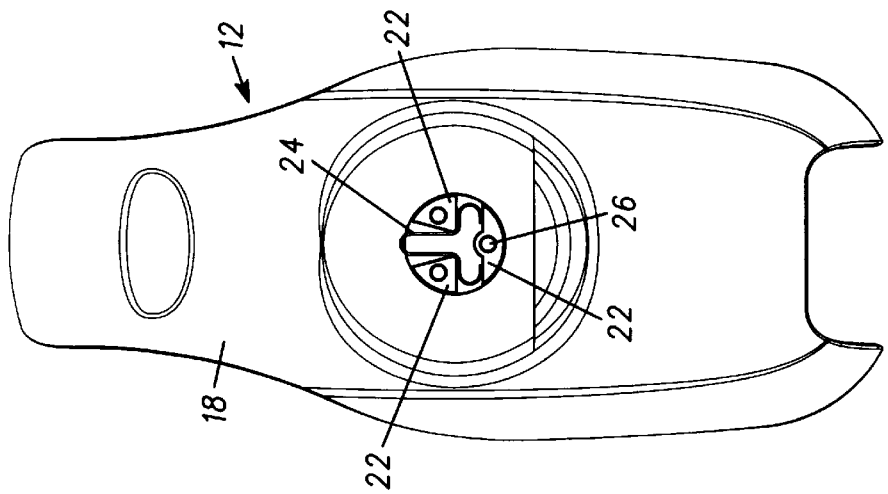
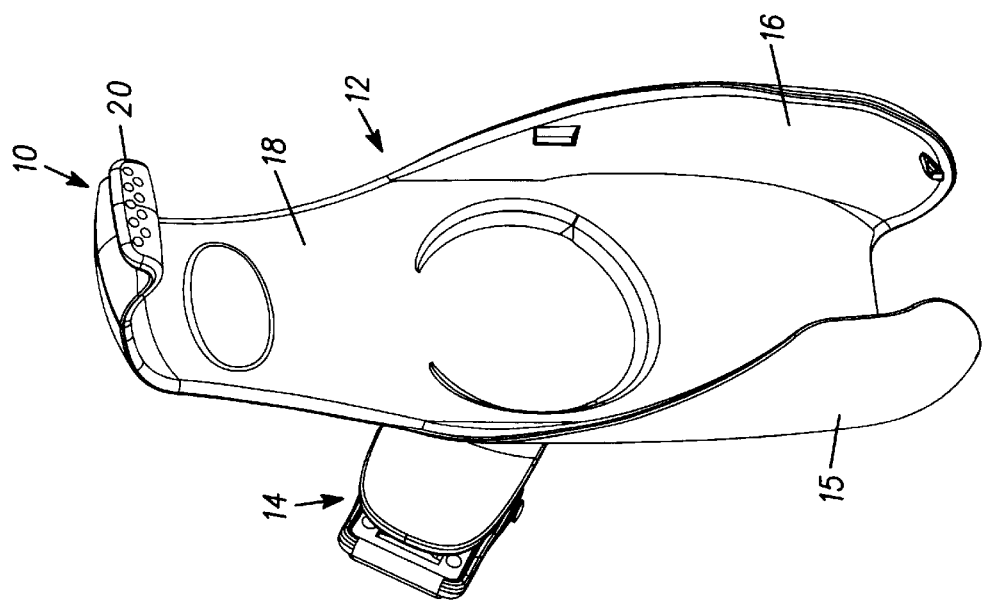

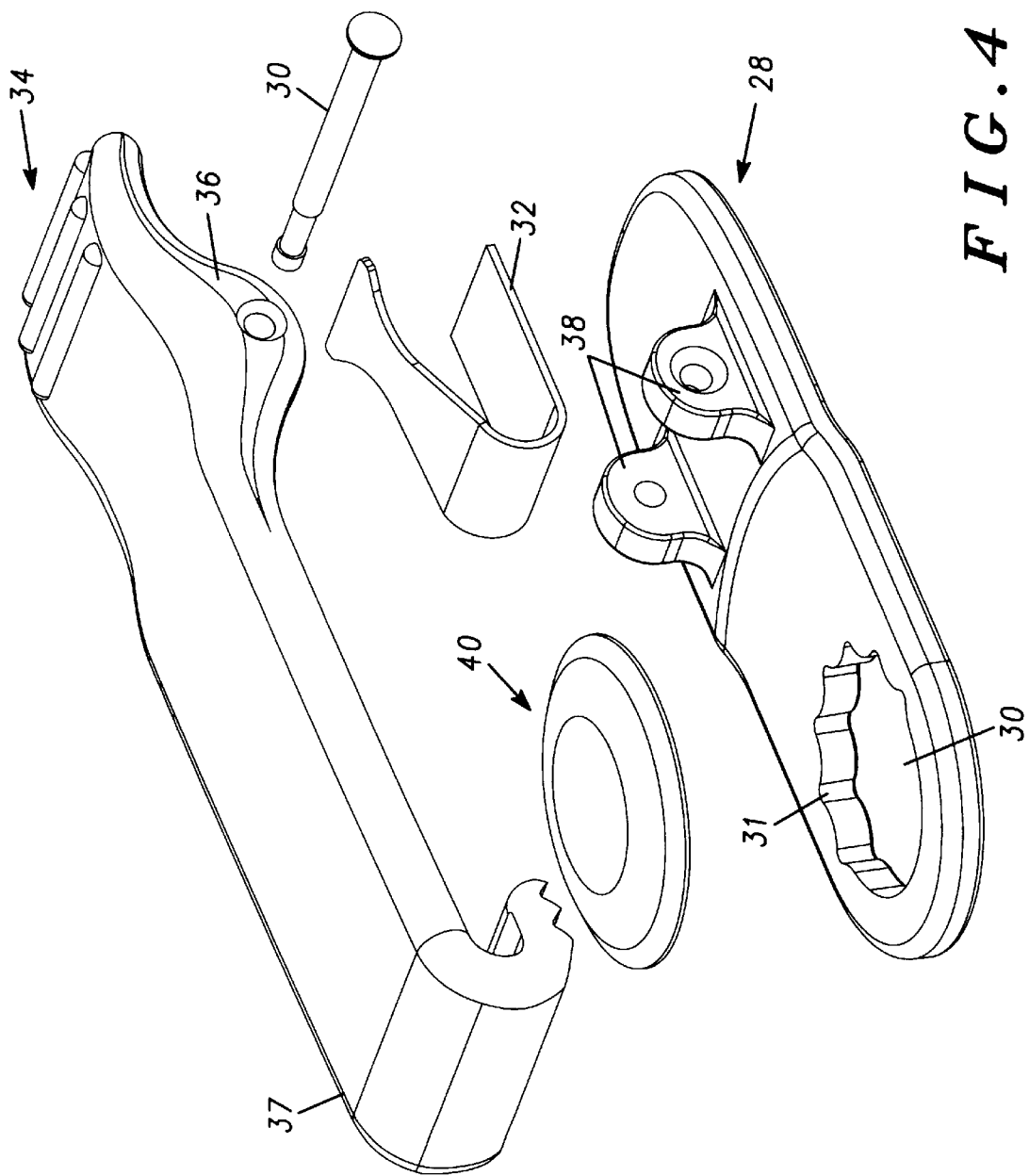

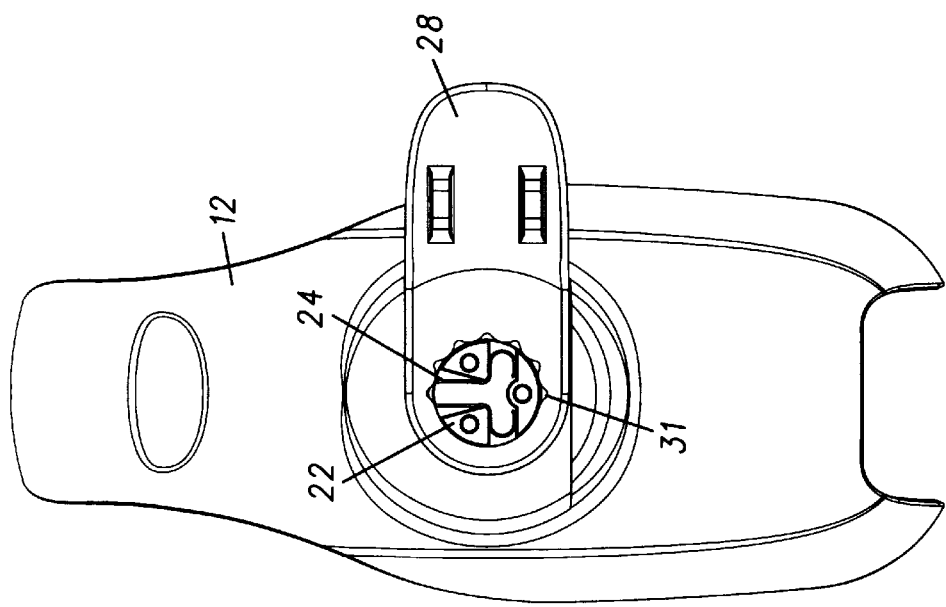
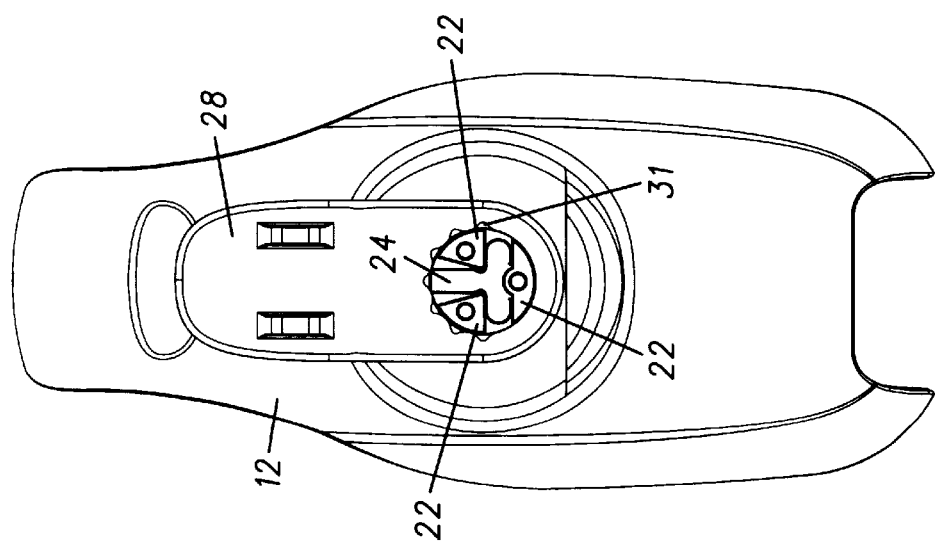

ADJUSTABLE CARRIER ASSEMBLY FOR A WIRELESS COMMUNICATION DEVICE

FIELD OF THE INVENTION

The present invention relates generally to support apparatus for electronic devices. Although the invention is subject to a wide range of applications, it is especially suited for use with a handheld radiotelephone, and will be particularly described in that connection.

BACKGROUND OF THE INVENTION

Increased miniaturization of the circuitry forming a wireless communication device has greatly increased the portability of such a device and has permitted carriage thereof by a user. Carrying devices that enable a user to carry a radiotelephone on a belt or other article of clothing are known in the art. These carrying devices typically include a portion for holding the radiotelephone and a clip portion attached to the carrying portion for attachment to a user's article of clothing. Once the carrying device is clipped to the article of clothing, the radiotelephone remains stationary in its angular orientation, typically vertical. This vertical orientation can cause discomfort when the user sits down. For example, the bottom of the carrying case can cause discomfort to the user's legs or the top of the carrying case or antenna of the radiotelephone can cause discomfort or pain to the user's side or stomach.

Firearm holsters that can be adjusted while worn on a user's article of clothing are known. U.S. Pat. No. 3,915,361 ('361 patent) describes a holster with a case for holding a hand-gun and an adjustable mounting clip for attachment to a belt or waistband of the user's clothing. The mounting clip or paddle is rotatable about its point of attachment to the case. The orientation of the paddle relative to the case can be adjusted to allow the holster to be worn either conventionally or in a cross-draw mode. The rotatable connection includes a metal ratchet wheel that couples to a grooved recess in a bracket that is integrally formed with the paddle. The radius of the ratchet wheel is substantially the same as the radius of the recess. Tightening of a screw against the face of the bracket binds the serrated outer edges of the ratchet wheel and the recess to hold the paddle in a fixed position relative to the case.

When the user desires to change the orientation of the paddle relative to the case, he or she must loosen the screw, rotate the paddle and then tighten the screw to maintain the new orientation of the paddle relative to the case. This process is timely and inconvenient because it requires the user to obtain a screwdriver or other tool before any adjustments can be made. Also, because the paddle is adjusted instead of the case, attachment to the user's belt or clothing can be compromised as the angle of orientation relative to the case increases.

U.S. Pat. No. 4,504,001 describes a swivel connected belt holster wherein the rotatable connection between the belt loop assembly and the holster includes two rigid plates. One of the rigid plates includes a number of bosses in a circular array. The other plate includes the same number of mating recesses in a circular array. When the holster is in use, the bosses of one plate engage mating recesses in the other plate and the plates are held in place by a position locking screw to provide rigid angular positioning of the holster body with respect to the belt loop assembly. As with the invention of the '361 patent, adjustment of the holster with respect to the belt loop assembly requires the timely and inconvenient steps of obtaining a tool, loosening a screw, adjusting the position and tightening a screw.

Accordingly, there is a need for a mountable carrying device for a portable radiotelephone whereby the position of the radiotelephone with respect to the mounting mechanism can be easily adjusted and locked into position without using a tool and while being worn on the user's belt or other article of clothing.

BRIEF DESCRIPTION OF THE DRAWINGS

FIG. 1 is a perspective view of the preferred embodiment of the carrier assembly of the present invention, FIG. 2 is a rear view of the device support member of the carrier assembly of FIG. 1.

FIG. 4 is an exploded view of the clip mechanism of FIG. 3.

FIG. 5 is a rear view of the carrier assembly of FIG. 1 with the device support member in a vertical position.

FIG. 6 is a rear view of the carrier assembly of FIG. 1 with the device support member in a horizontal position.

SUMMARY OF THE PREFERRED EMBODIMENT

Figure 3:
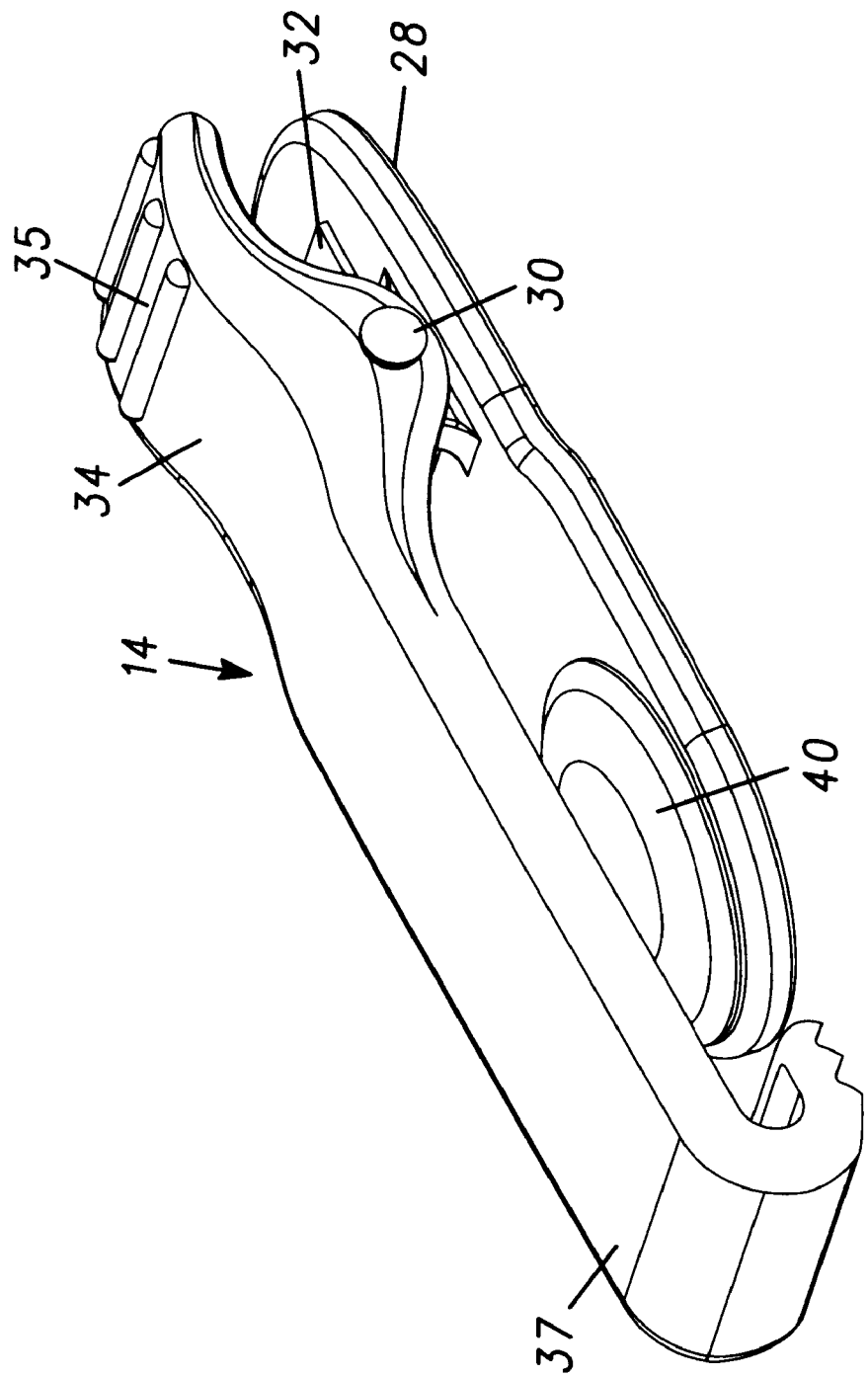
FIG. 3 is a perspective view of the clip mechanism of the carrier assembly of FIG. 1.

The present invention provides a carrier assembly for a wireless communication device that can be mounted on a belt or other article of clothing and worn with the device in a plurality of positions with respect to the mounting portion of the carrier assembly. In the presently preferred embodiment, the carrier assembly includes a device support member shaped to receive the wireless communication device; a first spring disposed in a portion of the device support member; and a clip mechanism attached to the device support member in a manner that allows the device support member to be rotated about the first spring and locked into a plurality of positions.

The present invention provides several advantages over known carrying devices. When a radiotelephone user is in the vertical (standing) position, it is common for he or she to wear the phone in the vertical position. In this position, the phone can be easily maneuvered into and out of the carrier assembly. However, wearing the device in the vertical position may cause the user discomfort when he or she sits or kneels down. Before sitting or kneeling, the user may want to tilt the device or wear it in a horizontal position so that the device does not cause discomfort to the legs or other parts of the body. The present invention allows the user to move the device into a plurality of angular positions and lock the device in place while maintaining the carrier assembly securely mounted on a belt or other article of clothing. In addition, the position of the device can be easily and quickly adjusted without using tools.

Additional advantages and novel features of the invention will be set forth in part in the description which follows, wherein the preferred embodiment of the invention is shown and described. Reference will now be made in detail to an embodiment configured according to the present invention.

DESCRIPTION OF THE PREFERRED EMBODIMENT

Referring first to the perspective view of FIG. 1, there is shown the preferred embodiment of the carrier assembly of the present invention, referred to generally by reference numeral 10. Carrier assembly 10 includes a device support member 12, a first spring 24 (not shown), preferably a T-shaped ratchet spring, attached to the device support member 12 and a clip mechanism 14 rotatably attached to the device support member 12.

The preferred embodiment of device support member 12 is integrally formed of curved side panels 15, 16, rear panel 18 and top portion 20 which are connected together to form a bracket for receiving a radiotelephone (not shown) therein. One of ordinary skill in the art will recognize that device support member 12 may include various configurations of panels depending on the dimensions of the device to be retained therein. In the preferred embodiment, the bracket formed by panels 15, 16, 18 and portion 20 is preferably injection molded using a blended plastic, commercially available from many sources, such as General Electric.

As shown in FIG. 2, the rear panel 18 of the preferred embodiment of the device support member 12 includes a plurality of fixed protrusions 22, preferably three, at least one side of each protrusion 22 having a rounded shape and the top side of each protrusion 22 including a cavity 26. The protrusions 22 are also preferably injection molded using a blended plastic. Preferably, the protrusions 22 are arranged such that the perimeter of the protrusions 22 form a substantially circular shape. Also preferably, the area between the protrusions 22 forms a substantially T-shape to allow the T-shaped ratchet spring 24 to be disposed therein and substantially held in place. The ratchet spring 24 is preferably stamped using a spring stainless steel.

Referring now to FIG. 3, there is shown the preferred embodiment of the clip mechanism 14 of the present invention. In the preferred embodiment, the clip mechanism includes a clip support member 28, a pin 30, a clip 34 having a displacement end 35 and an engagement end 37, a second spring 32, preferably a leaf spring and a cap 40. As shown in the exploded view of FIG. 4, one end of clip support member 28 preferably includes an opening 30 with a plurality of grooves 31 arranged in a circular array to mate with the device support member 12 (as shown in FIGS. 5 and 6). Integrally formed on the underside of cap 40 are a plurality of prongs (not shown), preferably three, for mating with cavities 26 of protrusions 22 (FIG. 2) formed on device support member 12. Preferably, cap 40 is injection molded using a blended plastic and is sonically welded to device support member 12.

Integrally formed on the other end of clip support member 28 is a plurality of clip pivot ears 38 having holes therethrough for connection using pin 30 through mating holes of pivot support members 36 integrally formed on clip 34. Preferably, clip support member 28 is injection molded using Delrin® 100 acetal resin commercially available from DuPont, or other suitable material. Preferably, clip 34 is injection molded using a blended plastic and pin 30 is formed by a screw machine using 302 HQ stainless steel. Disposed between clip 34 and clip support member 28, to allow pivotal movement of clip 34 in relation to device support member 12 about the axis of pin 30, is the second spring 32. Preferably, second spring 32, a U-shaped spring, is stamped using 304 SNS stainless steel. Spring 32 allows clip 34 to be easily placed onto and removed from the user's belt or other article of clothing.

FIGS. 5 and 6 show how clip support member 28 of clip mechanism 14 is coupled to the device support member 12. Opening 30 (FIG. 4) of clip support member 28 accepts protrusions 22 of device support member 12. The longest leg of first spring 24 disposed inside protrusions 22 fits into one of the grooves 31 of opening 30 thereby locking support member 12 in position with respect to clip mechanism 14.

The position of device support member 12 with respect to clip mechanism 14 can be adjusted by rotating first spring 24 attached to member 12 from one of the plurality of grooves 31 of opening 30 into an adjacent of the grooves 31. In the preferred embodiment, the device support member 12 can be placed in seven (7) different positions with respect to the clip mechanism 14. The seven (7) positions correspond to the seven (7) grooves (31) in clip support member 28. Preferably, rotation from one groove 31 to an adjacent groove 31 corresponds to thirty (30) degrees of rotation. Thus, the device support member 12 can be rotated through a total of one hundred eighty (180) degrees.

The repositionable carrier assembly of the present invention allows a user to carry a radiotelephone or other wireless communication device on an article of clothing more comfortably than known assemblies. Whenever the user desires, such as before sitting, he or she can adjust the orientation of the device so that it does not cause discomfort to parts of the body. The present invention allows the user to move the device into a plurality of angular positions and lock the device in place while maintaining the carrier assembly securely mounted on a belt or other article of clothing. No tools are required to effect the adjustment. The user can simply use one hand to turn the device support member 12 until the longest leg of the spring 24 attached thereto moves from one groove 31 of the clip support member 28 into another groove 31 of the clip support member 28. Because the tip of the longest leg of spring 24 fits snugly into the grooves 31, the position of the device support member 12 with respect to the clip assembly 14 is locked into place.

Those skilled in the art will recognize that various modifications and variations can be made in the apparatus of the present invention and in construction of this apparatus without departing from the scope or spirit of this invention.

What is claimed is:

1. A carrier assembly for a wireless communication device to enable the wireless communication device to be worn on an article of clothing in a plurality of positions, the carrier assembly comprising:

a device support member for receiving the wireless communication device;

a first spring disposed in a portion of the device support member;

a clip support member defining an opening having a plurality of grooves, the clip support member attached to the device support member wherein rotation of the device support member from one position to an adjacent position moves the spring from one of the plurality of grooves into an adjacent one of the plurality of grooves, thereby locking the device support member into position; and a clip having an engagement end and a displacement end, wherein the clip is attached to the clip support member in a manner such that pressing the displacement end causes the engagement end to be positioned away from the device support member for attachment of the device support member to the article of clothing.

2. A carrier assembly for a wireless communication device to enable the wireless communication device to be worn on an article of clothing in a plurality of positions, the carrier assembly comprising:

a device support member for receiving the wireless communication device;

a first spring disposed in a portion of the device support member;

a clip support member attached to the device support member in a manner that allows the device support member to be rotated about the first spring and locked into a plurality of positions;

a clip having an engagement end and a displacement end, wherein the clip is attached to the clip support member in a manner such that pressing the displacement end causes the engagement end to be positioned away from the device support member for attachment of the device support member to the article of clothing and;

a cap for securely fastening the clip support member to the device support member.

3. The carrier assembly of claim 2 wherein the cap is sonically welded to the clip support member and device support member.

* * * * *